US008605425B2

(12) United States Patent
Zhou et al.

(10) Patent No.: US 8,605,425 B2
(45) Date of Patent: Dec. 10, 2013

(54) DOCKING STATION FOR ELECTRONIC DEVICE

(75) Inventors: Cong-Bing Zhou, Shenzhen (CN); Quan-Chang Cheng, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 307 days.

(21) Appl. No.: 13/171,458

(22) Filed: Jun. 29, 2011

(65) Prior Publication Data

US 2012/0162902 A1 Jun. 28, 2012

(30) Foreign Application Priority Data

Dec. 24, 2010 (CN) .......................... 2010 1 0604395

(51) Int. Cl.
*G06F 1/16* (2006.01)

(52) U.S. Cl.
USPC ...................................... 361/679.43; 710/303

(58) Field of Classification Search
USPC .............................. 361/679.43; 710/303, 304
See application file for complete search history.

(56) References Cited

U.S. PATENT DOCUMENTS

| | | | | | |
|---|---|---|---|---|---|
| 5,619,397 | A | * | 4/1997 | Honda et al. | 361/679.43 |
| 5,627,727 | A | * | 5/1997 | Aguilera et al. | 361/679.43 |
| 5,737,541 | A | * | 4/1998 | Shimizu et al. | 710/303 |
| 5,751,546 | A | * | 5/1998 | Clark et al. | 361/679.43 |
| 6,015,308 | A | * | 1/2000 | Lee et al. | 439/155 |
| 6,069,790 | A | * | 5/2000 | Howell et al. | 361/679.43 |
| 6,185,095 | B1 | * | 2/2001 | Helot et al. | 361/679.44 |
| 6,216,195 | B1 | * | 4/2001 | Lee et al. | 710/303 |
| 6,231,371 | B1 | * | 5/2001 | Helot | 439/374 |
| 6,264,488 | B1 | * | 7/2001 | Helot et al. | 439/341 |
| 6,309,230 | B2 | * | 10/2001 | Helot | 439/131 |
| 6,533,599 | B1 | * | 3/2003 | Singleton, Jr. | 439/347 |
| 6,667,881 | B2 | * | 12/2003 | Oross et al. | 361/679.4 |
| 6,741,462 | B2 | * | 5/2004 | Kamphuis et al. | 361/679.02 |
| 6,885,552 | B2 | * | 4/2005 | Mullen et al. | 361/679.41 |
| 6,912,125 | B2 | * | 6/2005 | Weng | 361/679.41 |
| 6,952,344 | B2 | * | 10/2005 | Weng | 361/679.41 |
| 7,054,154 | B2 | * | 5/2006 | Mullen et al. | 361/679.57 |
| 7,227,747 | B2 | * | 6/2007 | Walker et al. | 361/679.41 |
| 7,381,079 | B2 | * | 6/2008 | Chuang | 439/352 |
| 7,405,929 | B1 | * | 7/2008 | Chuang et al. | 361/679.41 |
| 7,511,954 | B2 | * | 3/2009 | Tsai et al. | 361/679.41 |
| 2006/0092605 | A1 | * | 5/2006 | DeLuga et al. | 361/686 |
| 2007/0217145 | A1 | * | 9/2007 | Sung | 361/686 |

* cited by examiner

*Primary Examiner* — Lisa Lea Edmonds
(74) *Attorney, Agent, or Firm* — Altis Law Group, Inc.

(57) ABSTRACT

A docking station for a portable electronic device includes a housing, an interface, and a disengagement mechanism. The housing defines a receiving portion for accommodating the electronic device. The interface is disposed in the receiving portion so as to be engageable with the electronic device. The disengagement mechanism is disposed in the housing and configured for applying spring pressure to disengage the electronic device from the interface.

20 Claims, 7 Drawing Sheets

DOCKING STATION FOR ELECTRONIC DEVICE

BACKGROUND

1. Technical Field

The present disclosure relates to docking stations, and in particular, to a docking station for an electronic device.

2. Description of Related Art

Many hand held electronic devices, such as a mobile phone or a music player, include a docking station for providing a convenient interface for transferring data between the device and computing devices such as personal computers or peripheral devices such as speakers, monitors and printers without having to connect and disconnect cables. Generally, the docking station includes a slot for receiving the electronic device. Also, the docking station includes a connector adapted to connect electrically with a port of the electronic device. The connector is typically coupled to the external systems such as a power source and/or a computer through a cable so that communications between the hand held electronic device and the external system can take place. However, as the connector engages tightly with the electronic device, users wanting to remove the electronic device from the docking station need to use both hands and considerable strength to pull the electronic device and the docking station apart. This is inconvenient and the pulling may result in damage to the interface and/or the port of the device.

Therefore, there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
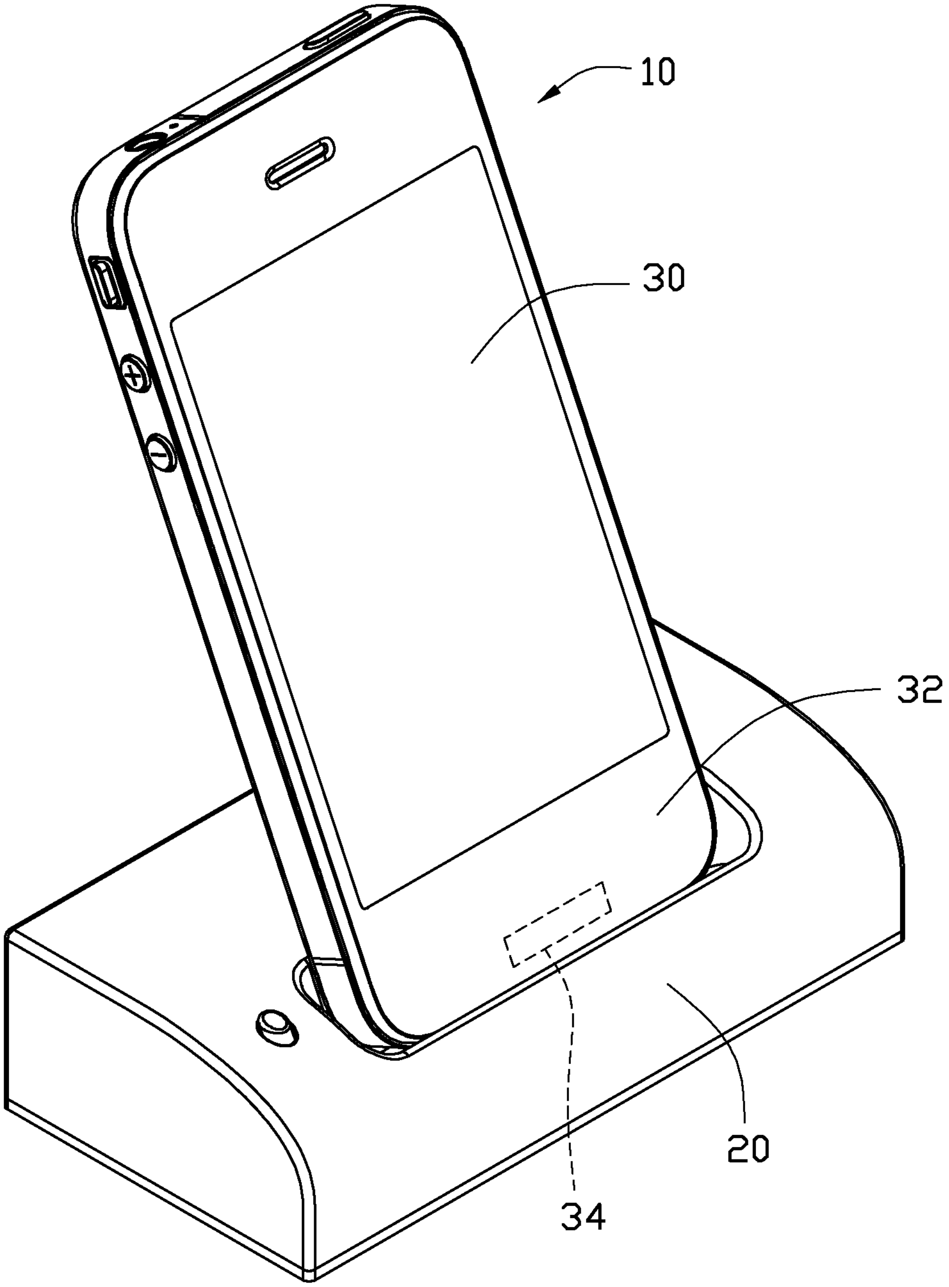
FIG. 1 is a schematic view of an electronic apparatus according to an embodiment of the present disclosure.

Referring to FIG. 1, an electronic apparatus 10 including a docking station 20 and an electronic device 30 securely engaged with the docking station 20 is shown, in accordance with an illustrated embodiment. The electronic device 30 may be a hand held electronic device such as a mobile phone, a tablet computer, etc. The electronic device 30 has a side portion 32 and a port 34 defined inside the side portion 32. In the illustrated embodiment, the side portion 32 is a bottom side of the electronic device 30, and the port 34 includes pins or contacts. The docking station 20 is used for positioning and supporting the electronic device 30 and providing a convenient interface between the electronic device 30 and peripheral devices, or a power supply such as a computer or a charger.

Figure 2:
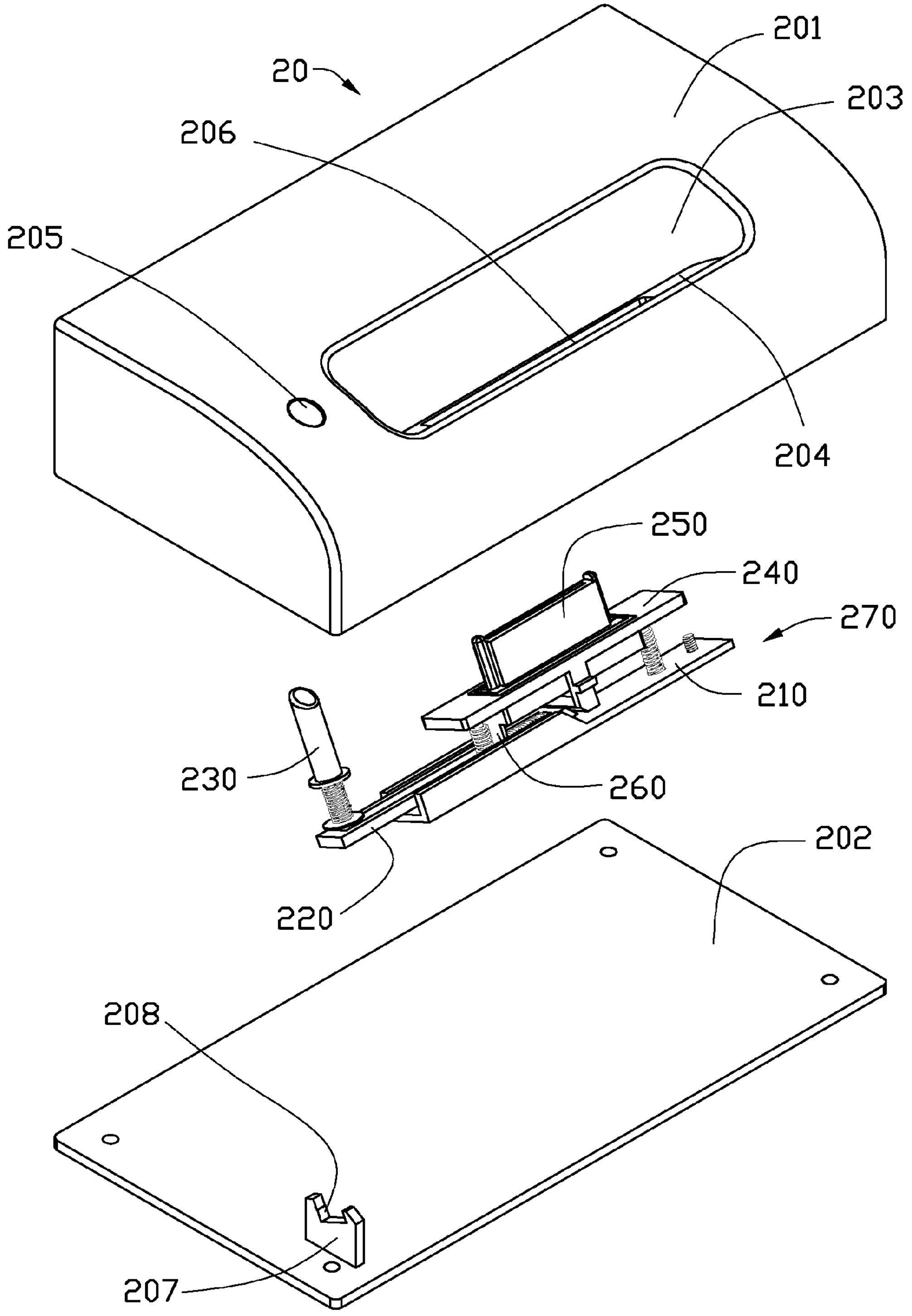
FIG. 2 is a partially exploded view of the docking station of FIG. 1.

Referring to FIG. 2, the docking station 20 includes a housing 200 (shown in FIG. 4) an interface 250 configured to electrically couple the electronic device 30 to the docking station 20 and a disengagement mechanism 270 for disengaging the electronic device 30 from the interface 250. The disengagement mechanism 270 may include a disengagement base 210 mounted to the housing 200, a locking unit 220, a driving unit 230, an ejecting unit 240 and a fixing member 260.

The housing 200 defines an interior space for accommodating the disengagement mechanism 270. The housing 200 includes a cover 201 and a housing base 202 attached to the cover 201. A first through hole 205 is defined in the cover 201. The cover 201 is partially depressed to form a receiving portion 203 adjacent to the first through hole 205 for receiving the side portion 32 of the electronic device 30. The receiving portion 203 includes a bottom wall 204 slanted back towards the housing base 202. A second through hole 206 is defined in the bottom wall 204 and communicates with the receiving portion 203 and with the interior space of the housing 200. The second through hole 206 is substantially rectangular. A supporting member 207 protrudes from the housing base 202 and a slot 208 is defined in the supporting member 207.

Figure 3:
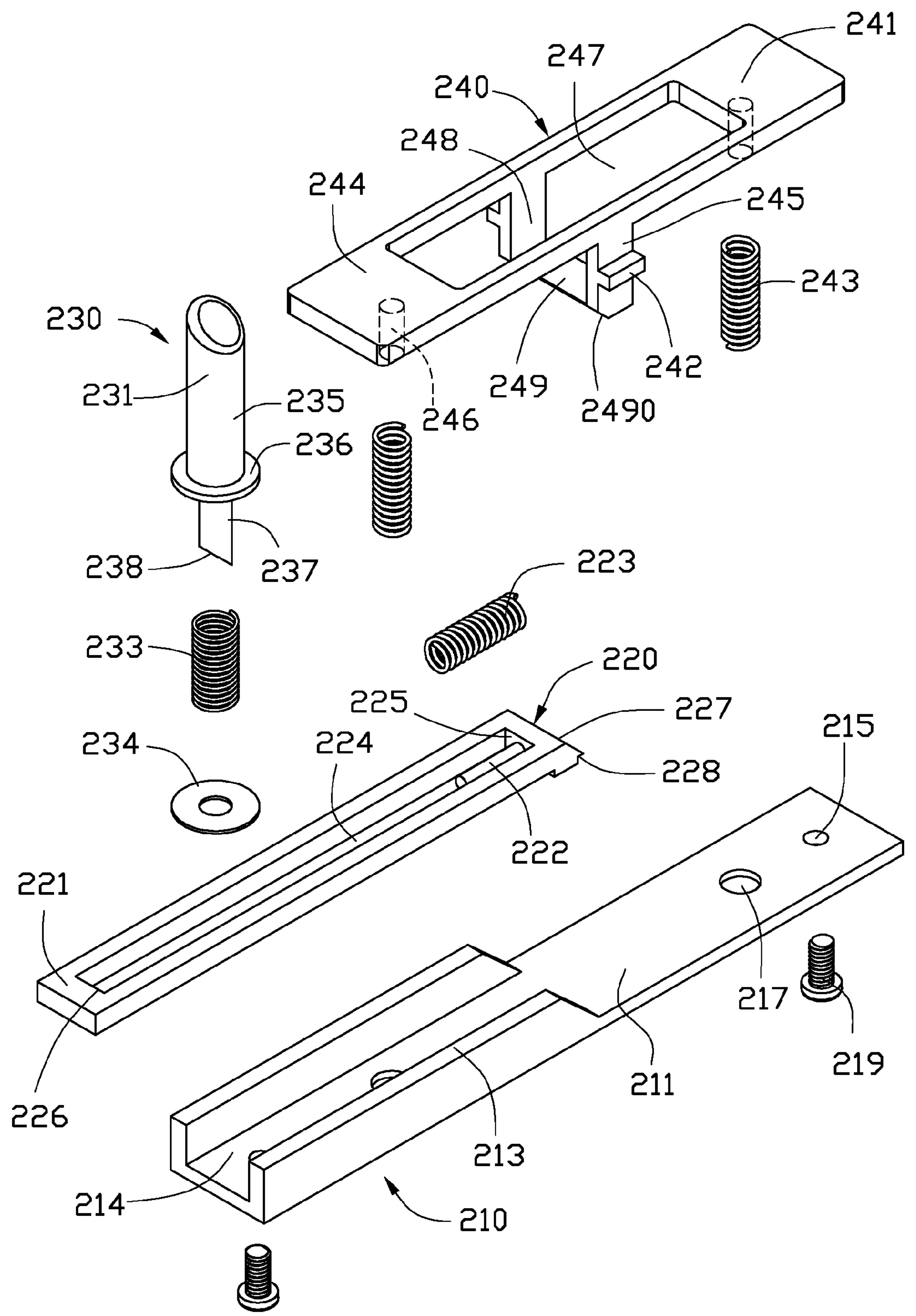
FIG. 3 is an exploded view of the disengagement mechanism of FIG. 2.

Referring also to FIG. 3, the disengagement base 210 is secured to the cover 201 via two screws 219. The disengagement base 210 includes a bottom wall 211 and two stopping walls 213 extending perpendicularly and upwards from the two lateral sides of the bottom wall 211 respectively. The stopping walls 213 define a channel 214. Two connection holes 215 respectively correspond to the two screws 219, and two slots 217 located between the two connection holes 215 are defined in the bottom wall 211.

The locking unit 220 includes a sliding member 221 slidably disposed in the channel 214 of the disengagement base 210 and supported by the supporting member 207 disposed on the housing base 202, a connection rod 222 integrally formed with the sliding member 221, and a first elastic member 223 sleeved on the connection rod 222. The sliding member 221 is substantially rectangular and defines a first opening 224 therein. The opening 224 has an internal first end 225 and an internal second end 226 opposite to the first end 225. The connection rod 222 extends longitudinally from the first end 225. The second end 226 defines a first engaging surface, which is an inclined surface (see FIG. 5) in the illustrated embodiment. The end of the sliding member 221 adjacent to the first end 225 of the opening 224 defines a first guiding surface 227 and an abutting surface 228. The first guiding surface 227 is substantially parallel to the first engaging surface. The abutting surface 228 is located beneath the first guiding surface 227 and is substantially parallel to the bottom wall 211.

The driving unit 230 includes a push member 231 for driving the sliding member 221 to slide in the channel 214 of the disengagement base 210, a second elastic member 233 sleeved on the push member 231, and a resistive support 234 for the bottom end of the second elastic member 233 sandwiched between the second elastic member 233 and the sliding member 221. The push member 231 includes a first part 235 slidably inserted in the first through hole 205 of the cover 201, a second part 237 on which the second elastic member 233 is sleeved, and a resisting part 236 disposed between the first part 235 and the second part 237 for resisting the top end of the second elastic member 233. The resisting part 236 has a diameter larger than that of the second part 237 so as to resist the end of the second elastic member 233. One end of the second part 237 which is away from the resisting part 236 defines a second engaging surface 238 parallel to the first engaging surface 226 of the sliding member 221.

The ejecting unit 240 includes an ejecting member 241 movably connected to the disengagement base 210, two restricting spaces 242 disposed on the ejecting member 241, and two third elastic members 243 between the ejecting member 241 and the disengagement base 210. The ejecting member 241 includes a frame 244 slidably inserted in the second through hole 206, an engaging portion 245 extending down from two opposite sides of the frame 244, and two connection posts 246 extending down from another two opposite sides 2440 of the frame 244 respectively. A second opening 247 fitting the interface 250 is defined in the frame 244 such that the frame 244 can frame the interface 250 and yet move up and down relative to the interface 250. The engaging portion 245 may be substantially U shaped, and includes two arms 248 protruding from the frame 244 and an end portion 249 connecting the two arms 248. The end portion 249 is substantially parallel to the frame 244, and the side of the end portion 249 furthest from the frame 244 defines a second guiding surface 2490. The second guiding surface 2490 is slanted so as to be parallel to the first guiding surface 227 of the sliding member 221. The restricting spaces 242 respectively protrude from the two arms 248 of the engaging portion 245 and face away from each other. The restricting spaces 242 abut the wall 204 of the receiving portion 203 to restrict the movement of the ejecting member 240.

Figure 5:
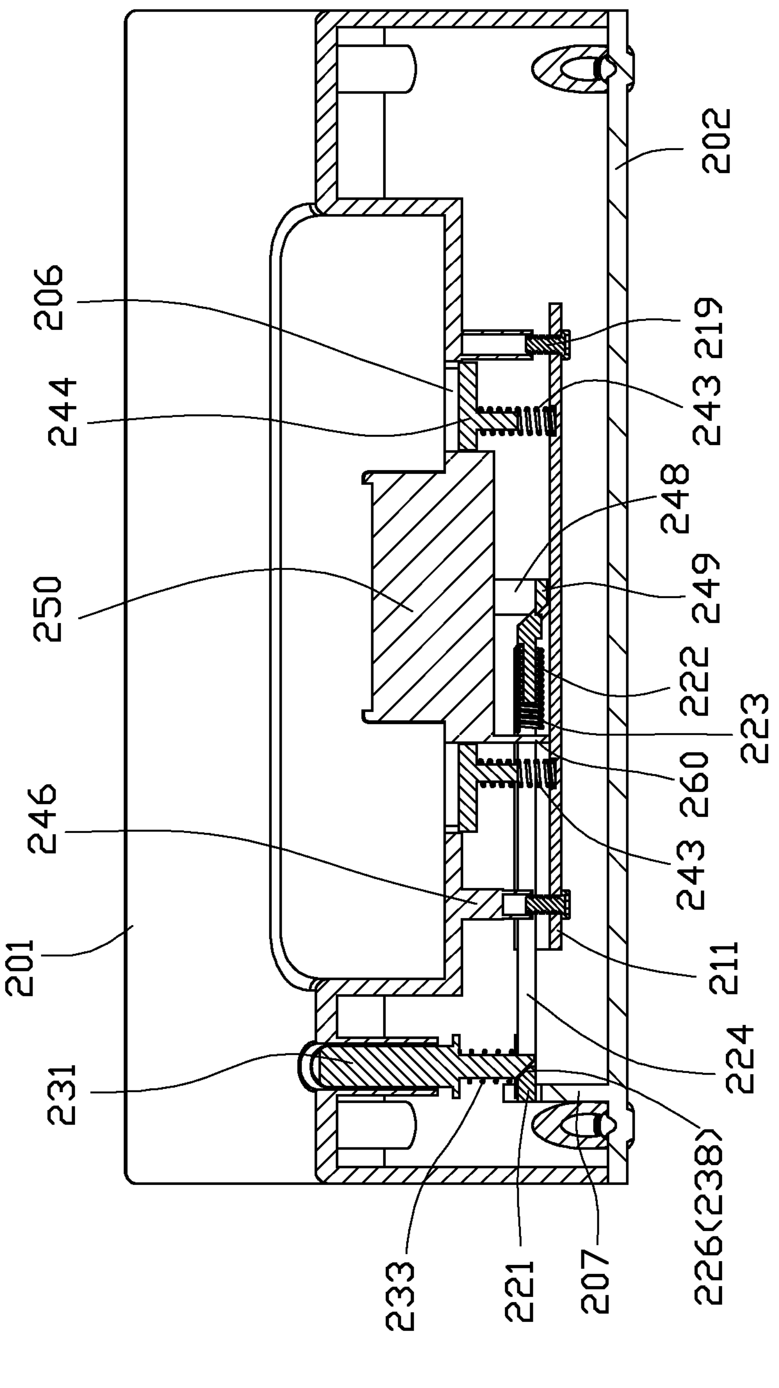
FIG. 5 is a cross-sectional view of the docking station of FIG. 4.

The interface 250 is mounted to the housing 200 and passes through the opening 247 of the frame 244 and the second through hole 206 of the receiving portion 203 to be exposed in the receiving portion 203. In the illustrated embodiment, the interface 250 is a plug connector adapted to engage with the port 34 of the electronic device 30 to allow communication therebetween, and the interface 250 extends upwardly along a direction perpendicular to the bottom wall 204 of the receiving portion 203. The fixing member 260 is used for mechanically connecting the interface 250 to the disengagement base 210. As shown in FIG. 5, the fixing member 260 is connected to the disengagement base 210 and abuts an end of the first elastic member 222 of the locking unit 220.

Figure 7:
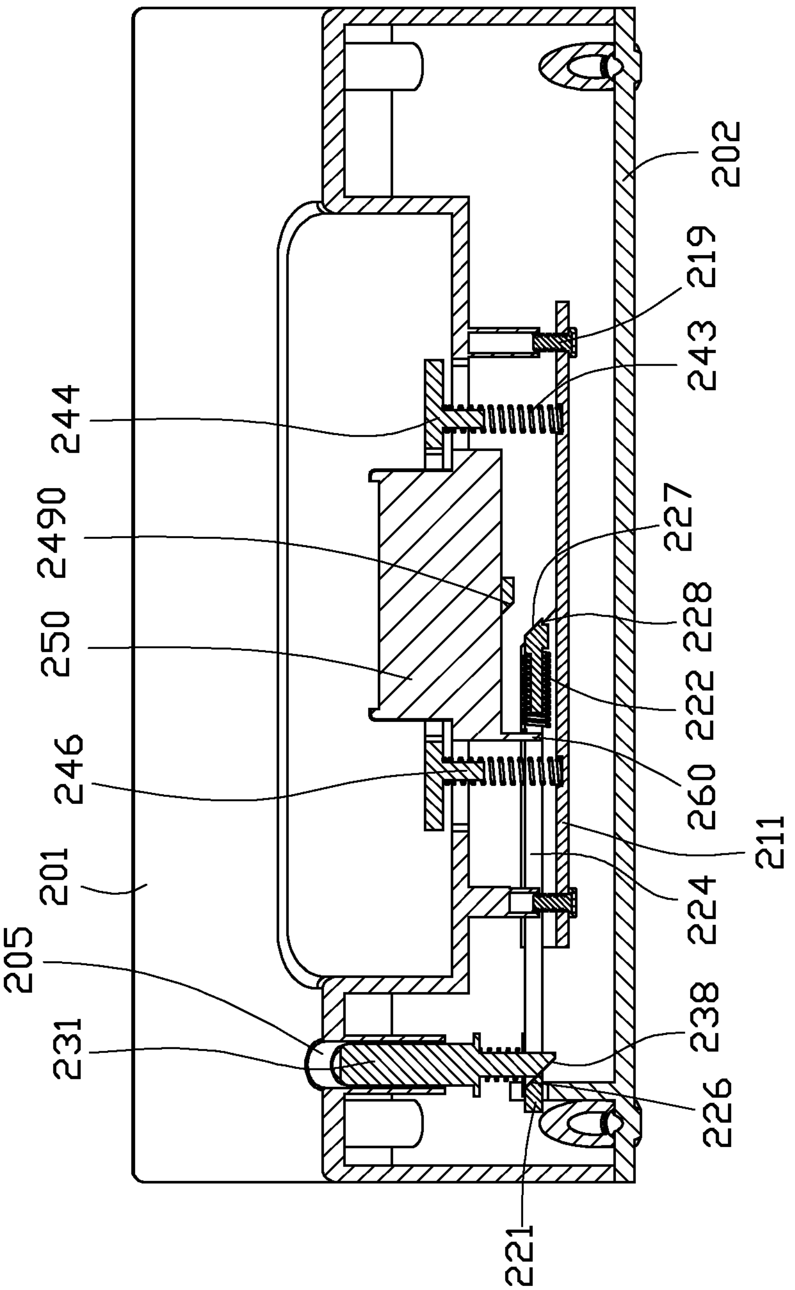
FIG. 7 is a cross-sectional view of the docking station of FIG. 6.

Referring to FIGS. 5 and 7, in assembly, one end of the sliding member 221 is slidably disposed in the channel 214 defined by the two stopping walls 213, while the other end of the sliding member 221 is received in the slot 209 of the supporting member 208. One end of the second elastic member 223 is sleeved on the connection rod 222 of the sliding member 221 while another end of thereof abuts the fixing member 260 so as to provide a spring force to the sliding member 221 along the direction of movement of the ejecting member 241. The resistive support 234 of the driving unit 230 is disposed on the sliding member 221 and corresponds to the second end 226 of the opening 224. The second part 237 of the push member 231 with the second elastic member 233 sleeved thereon passes through the resistive support 234 until the second engaging surface 238 abuts the second end 226 of the sliding member 221. The ejecting member 241 is connected to the bottom wall 211 of the base 21 with the third elastic members 243 respectively received in the connection slots 217. Then the disengagement base 210 is attached to the cover 201 by using the screws 219 screwed in the connection holes 215.

Figure 4:
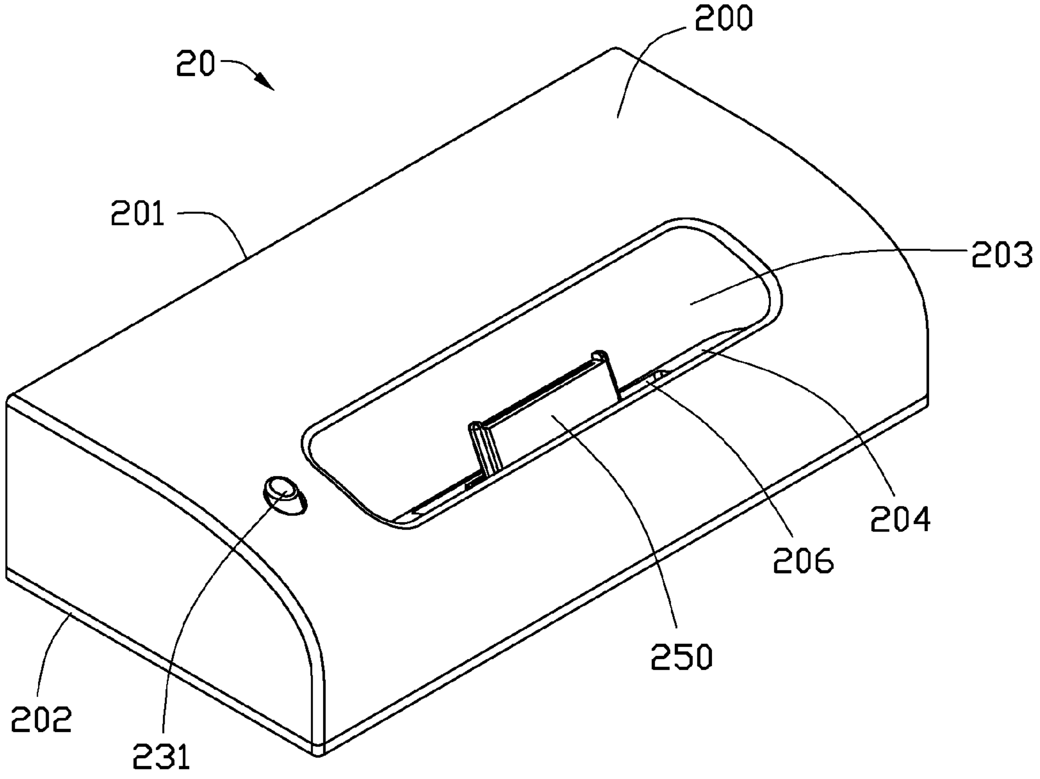
FIG. 4 is a schematic view of the docking station of FIG. 1 in a first state.

Referring to FIGS. 4-5, in use, when the electronic device 30 is inserted in the receiving portion 203 of the docking station 20, the port 34 of the electronic device 30 engages the interface 250 of the docking station 20. The side portion 32 of the electronic device 30 abuts the frame 244 in a state as shown in FIG. 7 and drives the ejecting member 241 to move along an inserting direction opposite to the extending direction of the interface 250. When the ejecting member 241 moves to a position where the second guiding surface 2490 of the engaging portion 249 abuts the first guiding surface 227 of the sliding member 221, the second guiding surface 2490 slides on the first guiding surface 227, and a first lateral component force is applied to the sliding member 221 at the first guiding surface 227. The sliding member 221 is driven by the first component force to move along a direction away from the ejecting member and the first elastic member 223 is compressed. As the second guiding surface 2490 moves completely beyond the first guiding surface 227, the first component force disappears, and the sliding member 221 is driven to move along a direction to the ejecting member 241 by the first elastic member 223 and to engage with the ejecting member 241 at the abutting surface 228. Therefore, the ejecting member 241 is held at a position as shown in FIG. 5. Meanwhile, the push member 230 of the driving unit 230 protrudes out of the housing 201 to be exposed above the top surface of the cover 204 under the elastic force from the second elastic members 233 (As shown in FIG. 5).

Figure 6:
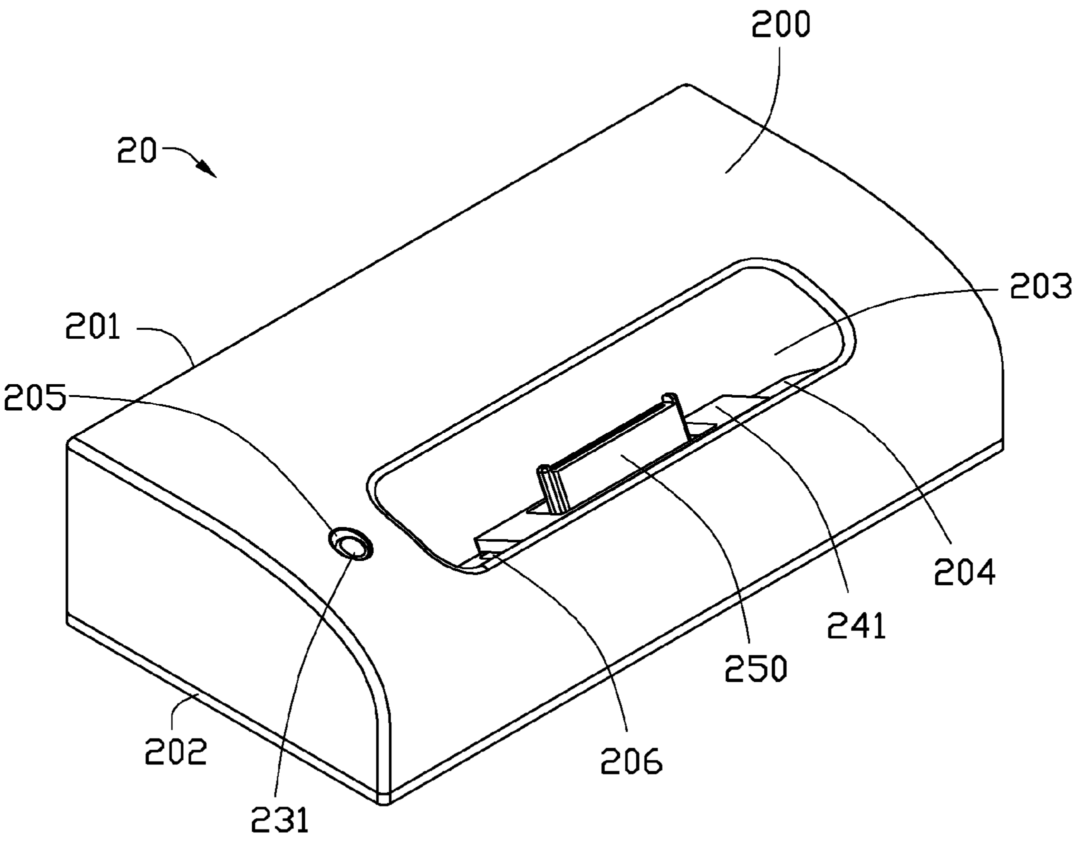
FIG. 6 is a schematic view of the docking station of FIG. 1 in a second state.

Referring to FIGS. 6-7, when the push member 231 is manually pushed down, the second engaging surface 238 applies a second lateral component force to the sliding member 221 at the second end 226 of the sliding member 221. The sliding member 221 is driven to move away from the ejecting member 241 to a position where the engagement between the locking unit 230 and the ejecting unit 240 is broken. The ejecting member 241 is then driven to move along a direction opposite to the insertion direction by the third elastic members 243 as shown in FIG. 7. The ejecting member 241 can apply a pushing force opposite to that of the inserting direction to the electronic device 30 along the direction opposite to the inserting direction so as to lift the electronic device and disengage the connection between the port 34 of the electronic device 30 and the interface 250 of the docking station 20.

With disengagement mechanism 270, the electronic device 30 can be removed from the docking station easily, and mishandling damage to the electronic device 30 can be minimized.

Even though information and the advantages of the present embodiments have been set forth in the foregoing description, together with details of the structures and functions of the present embodiments, the disclosure is illustrative only; and that changes may be made in detail, especially in matters of shape, size, and arrangement of parts within the principles of the present embodiments to the full extent indicated by the broad general meaning of the terms in which the appended claims are expressed.

What is claimed is:

1. A docking station for an electronic device, comprising:

a housing defining a receiving portion for accommodating the electronic device which is inserted into the receiving portion along an inserting direction;

an interface disposed in the receiving portion to be engageable with the electronic device; and a disengagement mechanism disposed in the housing and configured to disengage the electronic device from the interface, the disengagement mechanism comprising an ejecting member movably mounted to the housing and at least one elastic member connected to the ejecting member, the at least one elastic member applying a pushing force along a direction opposite to the inserting direction to the ejecting member when the electronic device is inserted into the receiving portion.

2. The docking station as claimed in claim 1, wherein the disengagement mechanism further comprises a locking unit adapted to lock the ejecting member.

3. The docking station as claimed in claim 2, wherein the ejecting member defines a first guiding surface, the locking unit comprises a sliding member defining a second guiding surface and an abutting surface, the first guiding surface slides on the second guiding surface to abut the abutting surface as the electronic device is inserted into the receiving portion.

4. The docking station as claimed in claim 3, wherein the disengagement mechanism further comprises a driving unit connected to the locking unit for driving the sliding member to disengage from the ejecting member.

5. The docking station as claimed in claim 4, wherein the sliding member defines a first engaging surface, the driving unit defines a second engaging surface, the second engaging surface slides on the first engaging surface to drive the sliding member to slide away from the ejecting member along a lateral direction substantially perpendicular to the inserting direction.

6. The docking station as claimed in claim 5, wherein the locking unit further comprises a second elastic member connected to the sliding member for replacing the sliding member.

7. The docking station as claimed in claim 5, wherein the driving unit comprises a push member exposed above the housing which can operatively move parallel to the inserting direction, the first engaging surface is defined in the push member, the sliding member defines an opening for passing the sliding member through, and the second engaging surface is defined in one end of the opening.

8. The docking station as claimed in claim 7, wherein the driving unit further comprises a third elastic member disposed between the push member and the sliding member for driving the push member to move along the inserting direction.

9. The docking station as claimed in claim 4, wherein the disengagement mechanism further comprises a disengagement base connected to the housing, and the disengagement base defines a channel for the sliding member to slide therein.

10. The docking station as claimed in claim 9, wherein the disengagement mechanism further comprises a fixing member for connecting the interface to the disengagement base, and the second elastic member is sandwiched between the sliding member and the fixing member.

11. The docking station as claimed in claim 3, wherein the disengagement mechanism further comprises at least one restricting space disposed on the ejecting member for restricting the ejecting member from continuously moving along the first direction after the electronic device is disengaged from the interface.

12. The docking station as claimed in claim 11, wherein the ejecting member comprises a frame passing the interface through and an engaging portion protruding from the frame, the receiving portion comprises a bottom wall passing the frame through, and the at least one restricting space is connected to the engaging portion for abutting the bottom wall as the ejecting member moves along the first direction for a certain distance.

13. The docking station as claimed in claim 12, wherein the engaging portion comprises two arms protruding from the frame, the at least one restricting space protruding from one arm of the engaging portion.

14. The docking station as claimed in claim 13, wherein the engaging portion comprises an end portion connecting the arms, the first guiding surface is defined in the end portion of the engaging portion.

15. A docking station for an electronic device, comprising:

a housing defining a receiving portion for accommodating the electronic device which is inserted into the receiving portion along an inserting direction;

an interface disposed in the receiving portion to be engageable with the electronic device; and a disengagement mechanism disposed in the housing and configured to disengage the electronic device from the interface, the disengagement mechanism comprising an ejecting unit for applying a pushing force to the electronic device along a direction opposite to the inserting direction and a locking unit adapted to lock the ejecting unit, the ejecting unit defining a first guiding surface, the locking unit comprising a sliding member defining a second guiding surface and an abutting surface, the first guiding surface sliding on the second guiding surface to abut the abutting surface as the electronic device is inserted into the receiving portion.

16. The docking station as claimed in claim 15, wherein the ejecting unit comprises an ejecting member movably mounted to the housing and at least one elastic member connected to the ejecting member, the at least one elastic member applies a pushing force along a direction opposite to the inserting direction to the ejecting member when the electronic device is inserted into the receiving portion.

17. The docking station as claimed in claim 16, wherein the disengagement mechanism further comprises a driving unit connected to the locking unit for driving the sliding member to disengage from the ejecting member.

18. The docking station as claimed in claim 17, wherein the sliding member defines a first engaging surface, the driving unit defines a second engaging surface, the second engaging surface slides on the first engaging surface to drive the sliding member to slide away from the ejecting member along a lateral direction substantially perpendicular to the inserting direction.

19. The docking station as claimed in claim 18, wherein the locking unit further comprises a second elastic member connected to the sliding member for replacing the sliding member.

20. The docking station as claimed in claim 18, wherein the driving unit comprises a push member exposed above the housing which can operatively move parallel to the inserting direction, the first engaging surface is defined in the push member, the sliding member defines an opening for passing the sliding member through, and the second engaging surface is defined in one end of the opening.

* * * * *